United States Patent [19]

Mudde

[11] Patent Number: 4,508,576
[45] Date of Patent: Apr. 2, 1985

[54] HOT-WATER DISPERSIBLE CORN STARCH HAVING HIGH PASTE VISCOSITY

[75] Inventor: John P. Mudde, Oak Lawn, Ill.

[73] Assignee: CPC International Inc., Englewood Cliffs, N.J.

[21] Appl. No.: 542,952

[22] Filed: Oct. 18, 1983

[51] Int. Cl.[3] .................... C13L 1/08; C08L 3/00
[52] U.S. Cl. .................... 106/213; 127/32; 127/33; 127/71
[58] Field of Search ............. 106/213; 127/169, 71, 127/32, 33

[56] References Cited

U.S. PATENT DOCUMENTS

| | | | |
|---|---|---|---|
| 2,400,402 | 5/1946 | Evans | 127/33 |
| 2,913,359 | 11/1959 | Pollock et al. | 127/71 |
| 3,537,893 | 11/1970 | Hauser et al. | 127/32 |
| 3,904,429 | 9/1975 | Eastman et al. | 127/71 |
| 4,391,836 | 7/1983 | Chiu | 127/71 |
| 4,418,090 | 11/1983 | Bohrmann et al. | 426/578 |

FOREIGN PATENT DOCUMENTS

| | | |
|---|---|---|
| 59050 | 9/1982 | European Pat. Off. . |
| 1479515 | 7/1977 | United Kingdom . |
| 2107339 | 4/1983 | United Kingdom . |

OTHER PUBLICATIONS

Gray, et al., "Effects of Surfactants and Fatty Adjuncts on the Swelling and Solubilization of Granular Starches", *Die Starke*, vol. 14, No. 7, pp. 239–246 (1962).

*Primary Examiner*—Theodore Morris
*Attorney, Agent, or Firm*—Stanley M. Parmerter

[57] ABSTRACT

A process for preparing a corn starch product that forms a uniform viscous dispersion when added to boiling water. This process comprises heating a mixture of starch, surfactant and water followed by subjecting the mixture to microwave radiation.

10 Claims, No Drawings

HOT-WATER DISPERSIBLE CORN STARCH HAVING HIGH PASTE VISCOSITY

FIELD OF THE INVENTION

This invention relates to a hot-water dispersible corn starch and to a process for its production.

BACKGROUND OF THE INVENTION

Starches occur in nature in the form of discrete granules. When a suspension of granular starch is heated in water to a point above its gelatinization temperature, the granules undergo hydration and gelatinize to form a viscous dispersion or paste. This property has led to the use of starch as a thickening agent, particularly in food applications.

It is well known that if one simply adds starch, or a mixture containing starch, to boiling water, the starch rapidly forms lumps which cannot be dispersed even with the most vigorous and extended stirring. The lumps are formed when clusters of starch granules contact the hot water. The outer portions of the starch clusters immediately gelatinize, and this "coating" of gelatinized starch forms a barrier against water penetration into the clusters.

One way to overcome the lumping problem is to disperse the starch completely in cold water before the mixture is heated and gelatinized. This method is time consuming and for many applications it is necessary, or preferable, to add the thickening agent to the hot liquid.

Starches can be made more readily dispersible in hot water by complexing them with a surfactant. This method involves mixing native starch, water and a surfactant at a suitable temperature for a sufficient time to impart the desired properties to the starch without causing substantial gelatinization of the starch granules. While this method has proven to be satisfactory for modifying starches of roots and tubers, such as tapioca and potato, it is less satisfactory when applied to corn starch. If such a corn starch-surfactant complex is stirred in boiling water, the paste tends to be lumpy even though it develops a fairly high viscosity.

Starches have also been treated with UHF (ultra-high frequency) radiation, also known as microwave radiation, in order to modify their properties. This method gives starches which are somewhat more dispersible in hot water than native starch. However, these starches are either not completely dispersible in hot water or their dispersions do not give the viscosity required for a thickening agent.

A process has now been discovered that gives a modified corn starch which is substantially completely dispersible in hot water. Furthermore, its hot-water dispersion has a high viscosity making it suitable for use as a thickening agent in food and other applications.

SUMMARY OF THE INVENTION

There is provided in accordance with this invention a process for the treatment of corn starch which comprises the steps of mixing granular corn starch, a surfactant component comprising at least one surfactant containing a fatty acid moiety, and water in an amount of about 43% to about 50% by weight of the combined mixture. A portion of this water may be present as the natural moisture content of the starch. The uniform mixture is heated at a temperature from about 50° C. to about 85° C. for at least 1 hour in a closed container, and the resulting product is subjected to microwave radiation in an open container until the water content of the mixture is reduced to below about 15% by weight. This process provides a starch product having substantially complete hot-water dispersibility. Furthermore, a 5% dispersion of the starch product in boiling water has a viscosity of at least about 2000 centipoises when measured at 70° C.

DETAILED DESCRIPTION OF THE INVENTION

Grain starches, and particularly corn starch, have traditionally been used as thickeners for gravies and sauces. As previously noted, such starches must be completely dispersed in cold water prior to heating above their gelatinization temperature. A hot- or boiling-water dispersible starch product which would provide a consistent and uniform paste with no lumps or agglomerated masses would be desirable for improved convenience. Such a starch product would be particularly desirable for use in food products prepared in the home. The consumer would not have to follow the involved preparation procedures presently associated with food products containing sauces and gravies.

It has now been found, surprisingly, that microwave treatment of a corn starch-surfactant mixture yields a starch product which disperses fully in hot or boiling aqueous liquid and which provides a dispersion with high viscosity. It has further been found that corn starch complexes with the surfactant at much lower temperatures than those previously required to make a grain starch dispersible in hot water. Therefore, the starch can be treated by a process that develops little pressure and is much more adaptable to continuous, rather than batch processing. Also, since the microwave treatment can be employed in drying the starch, the microwave radiation required in the practice of the present invention can be used alone or in conjunction with traditional drying methods to bring the treated starch to its final moisture content.

The first step of the process of the present invention involves mixing granular corn starch, a surfactant component and water. The mixture contains from about 43% to about 50% water by weight. This includes the water present as the natural moisture content of the starch. The surfactant component comprises from about 0.2% to about 3% by weight of the mixture.

The surfactant component includes at least one surfactant containing a fatty acid moiety. Examples of suitable surfactants are glycerol monostearate, sorbitol monostearate, propylene oxide monostearate, hexamethylene glycol distearate, and sodium stearate. If the starch is to be used in a food application, a food-grade surfactant suitable for use in such applications is employed.

The uniform mixture of starch, surfactant and water is then heated in a closed container at a temperature from about 50° C. to about 85° C. in order to promote association between the surfactant component and starch. The mixture is heated for at least 1 hour, and may be heated for a longer period of up to about 10 hours. In a preferred method, the mixture is heated for about 5 hours at 65° C.

After the mixture of starch, surfactant and water is heated in a closed container, it is subjected to microwave treatment in an open container. Preferably, the mixture is ground in a mill to break up any lumps before it is subjected to microwave radiation.

Microwave treatment, as used herein, involves the use of electromagnetic radiation in the range of from about three hundred Megahertz (300 MHz) to about three hundred thousand Megahertz (300,000 MHz). Within this range, only certain specific bands are generally permitted for industrial use. In most countries, these include the frequencies of 915 and 2450 MHz.

The time required to obtain the desired characteristics by microwave treatment of the starch will vary. The time of treatment will depend on such factors as the power of the microwave equipment, the weight and configuration of the starch being treated and the temperature to which the starch can be subjected. Ordinarily, the time of exposure to the UHF radiation will be from 2 minutes to 15 minutes, preferably from 4 minutes to 6 minutes. The actual duration of UHF treatment will depend as well on the moisture content of the starch, particularly where the microwave treatment is also intended to effect drying of the starch.

The nature of the equipment used is not critical, and a commercially available microwave oven was employed in the examples reported herein. This machine cycles periodically and it is not required, therefore, that the starch be subjected to radiation during one uninterrupted period. It is envisioned that a commercial process may comprise a tunnel having a cavity which forms a wave guide for the UHF radiation with dimensions which may determine the frequency of the radiation. Such equipment is commercially available from Industrie Microondes Internationale under the trademark GIGATRON.

Since the microwave treatment can be employed to dry the treated starch, the starch material can be carried by a conveyor belt through the microwave tunnel and then bagged directly.

The following examples will serve to better illustrate the present invention.

EXAMPLE 1

Five hundred and fifty-five grams (555 g) of native corn starch representing 500 g dry substance (90.1% d.s.) was placed in a Hobart mixer and sprayed with a suspension of 5 g of glycerol monostearate in 359 g water. The resulting mixture was then placed in closed quart bottles and heated in an oven at 65° C. for 7½ hours.

Following this treatment, a 100-g portion of the starch was placed on a glass dish and dried in a microwave oven for a period of 4 minutes. The microwave oven used in this experiment was a Sharp Carousel, Model No. R7710, operating at 650 watts and a frequency of 2450 MHz. The plate was then visually inspected, lumps were broken apart and microwave treatment continued for an additional 2 minutes, after which a final weight of approximately 60 g was obtained. The dry product was milled and screened, yielding approximately 50 g of starch material between 20 mesh and 60 mesh.

The starch material obtained in this manner was tested for hot-water dispersibility and was completely dispersible without any lump formation. The viscosity, measured at 70° C., was approximately 3500 centipoises (cps).

To measure hot-water dispersibility, 100 ml of water is brought to boiling in a 200-ml beaker. Then, 5.0 g of starch is added with manual stirring. Heating with occasional stirring is continued for 2 minutes. Any lump formation is determined by visual inspection. Viscosity of the hot dispersion is determined after it is adjusted to contain exactly 100 g of water and then allowed to cool to 70° C. Viscosity is measured using a Brookfield RVT viscometer, using a No. 3 spindle at 10 revolutions per minute.

EXAMPLE 2

The general procedure of Example 1 was followed using mixtures of starch and glycerol monostearate containing varying percentages of water. The mixtures were heated at 65° C. for 5 hours before they were dried in the microwave oven. Results of the tests given in Table I show that the process of this invention gives a hot-water dispersible product when the starting mixture contains from about 43% to about 50% water. Furthermore, the hot-water dispersion has high viscosity.

TABLE I

| % Water in Starch-Water Mixture[a] | Hot-Water Dispersion | Viscosity (cps at 70° C.) |
| --- | --- | --- |
| 30[b] | Very lumpy | 2900 |
| 40 | Lumpy | 3700 |
| 43 | 1 small lump | 5200 |
| 45 | No lumps | 5300 |
| 50 | No lumps | 4000 |

[a] All mixtures contained 1% glycerol monostearate.
[b] Comparative test.

EXAMPLE 3

The general procedure of Example 1 was followed in which a suspension of glycerol monostearate in water was mixed with corn starch to form mixtures containing 55 parts starch, 45 parts water and 1 part glycerol monostearate. These mixtures were heated at 65° C. in closed containers for various times before they were dried in the microwave oven, ground, sifted and tested in the same manner as the samples in Example 1.

The results, given in Table II, demonstrate that in order to obtain a product that will give a hot-water dispersion of high viscosity, it is necessary to warm the mixture of starch, water and surfactant before it is dried in the microwave oven.

TABLE II

| Time Mixture[a] Heated (hrs) at 65° C. | Hot-Water Dispersion | Viscosity (cps at 70° C.) |
| --- | --- | --- |
| 0[b] | No lumps | 250 |
| 1 | 5 lumps | 2100 |
| 4 | No lumps | 3400 |
| 6 | 2 lumps | 4000 |
| 7.5 | No lumps | 3400 |

[a] All mixtures contained 45 parts water, 55 parts corn starch and 1 part glycerol monostearate.
[b] Comparative test, not an example of this invention.

EXAMPLE 4

The general procedure of Example 1 was followed in which a suspension of glycerol monostearate in water was mixed with corn starch to form a mixture containing 55 parts starch, 45 parts water and 1 part glycerol monostearate. The mixture was then heated for 5 hours in a closed container at 65° C. before it was divided into three portions. One part was heated in the microwave oven at full power for 6 minutes; a second part was air-dried overnight at room temperature; and a third part was dried in an oven for 1 hour at 140° C.

Boiling water (100 ml) was poured onto a 5-g sample of each starch. On stirring, all three starches dispersed without lump formation, but the viscosities of the dispersions were only 50–100 cps at 70° C.

When the starches were added to boiling water in the usual dispersion test, only the microwave treated starch gave a smooth dispersion. This had a viscosity of 3600 cps at 70° C. The starches, dried without microwave treatment for comparative test purposes, gave very lumpy dispersions with viscosities of 2200–2600 cps at 70° C.

COMPARATIVE TESTS

The procedure of Example 1 was followed except that the starch-water mixture was not heated at 65° C. prior to drying in the microwave oven and no surfactant was added. The results, given in Table III, indicate that microwave treatment alone can give a hot-water dispersible product if sufficient water is present. However, this hot-water dispersion does not possess high viscosity.

TABLE III

| % Water in Starch-Water Mixture[a] | Hot-Water Dispersion | Viscosity (cps at 70° C.) |
|---|---|---|
| 30 | Very lumpy | (Not measured) |
| 40 | 1 lump | 550 |
| 44 | No lumps | 250 |
| 45 | No lumps | 200 |

[a]Mixture contained no surfactant and was not heated before microwave drying.

Additional comparative tests were made following the general procedure of Example 1 except that no surfactant was added. The mixtures were heated for 5 hours at 65° C. in a closed container before they were dried in a microwave oven. The results, given in Table IV, indicate that heating a starch-water mixture in a closed container followed by microwave drying gives a product whose hot-water dispersion shows only low viscosity when no surfactant is present.

TABLE IV

| % Water in Starch-Water Mixture[a] | Hot-Water Dispersion | Viscosity (cps at 70° C.) |
|---|---|---|
| 30 | Very lumpy | 300 |
| 40 | Lumpy | 250 |
| 43 | No lumps | 350 |
| 45 | No lumps | 150 |
| 50 | No lumps | 100 |

[a]Mixture which contained no surfactant was heated in a closed container at 65° C. for 5 hours before microwave drying.

Other features, advantages and specific embodiments of this invention will become readily apparent to those exercising ordinary skill in the art after reading the foregoing disclosures. These specific embodiments are within the scope of the claimed subject matter unless otherwise expressly indicated to the contrary. Moreover, while specific embodiments of this invention have been described in considerable detail, variations and modifications of these embodiments can be effected without departing from the spirit and scope of this invention as disclosed and claimed.

What is claimed is:

1. A process for the treatment of corn starch which comprises the steps of
   (a) mixing
      (i) a starch component comprising granular corn starch,
      (ii) a surfactant component comprising at least one surfactant containing a fatty acid moiety, and
      (iii) water in the amount of about 43% to about 50% by weight of the combined mixture, any portion of which water may be present as the natural moisture content of said starch component, to form a uniform mixture;
   (b) heating the mixture of Step (a) at a temperature from about 50° C. to about 85° C. for at least 1 hour in a closed container; and
   (c) subjecting the product of Step (b) to microwave radiation in an open container until the moisture content of the mixture is reduced to below about 15% by weight;
to produce a starch product having substantially complete hot-water dispersibility capable of forming a 5% dispersion when added to boiling water, said dispersion having a viscosity of at least about 2000 centipoises when measured at 70° C.

2. The process of claim 1, characterized in that the starting mixture contains from about 0.2% to about 3% by weight of surfactant.

3. The process of claim 1, characterized in that the time of microwave drying is from about 2 minutes to about 15 minutes.

4. The process of claim 1, characterized in that the surfactant is selected from the group consisting of glycerol monostearate, sorbitol monostearate, propylene oxide monostearate, hexamethylene glycol distearate, and sodium stearate.

5. The process of claim 1, characterized in that the water content of the mixture of Step (a) is from about 45% to about 50% by weight of the mixture.

6. A starch-surfactant mixture having substantially complete hot-water dispersibility capable of forming a 5% dispersion when added to boiling water, said dispersion having a viscosity of at least about 2000 centipoises when measured at 70° C., prepared by the steps of
   (a) mixing
      (i) a starch component comprising granular corn starch,
      (ii) a surfactant component comprising at least one surfactant containing a fatty acid moiety, and
      (iii) water in the amount of about 43% to about 50% by weight of the combined mixture, any portion of which water may be present as the natural moisture content of said starch component, to form a uniform mixture;
   (b) heating the mixture of Step (a) at a temperature from about 50° C. to about 85° C. for at least 1 hour in a closed container; and
   (c) subjecting the product of Step (b) to microwave radiation in an open container until the moisture content of the mixture is reduced to below about 15% by weight.

7. The starch-surfactant mixture of claim 6, characterized in that the starting mixture contains from about 0.2% to about 3% by weight of surfactant.

8. The starch-surfactant mixture of claim 6, characterized in that the time of microwave drying is from about 2 minutes to about 15 minutes.

9. The starch-surfactant mixture of claim 6, characterized in that the surfactant is selected from the group consisting of glycerol monostearate, sorbitol monostearate, propylene oxide monostearate, hexamethylene glycol distearate, and sodium stearate.

10. The starch-surfactant mixture of claim 6, characterized in that the water content of the mixture of Step (a) is from about 45% to about 50% by weight of the mixture.

* * * * *